(12) United States Patent
Kwon et al.

(10) Patent No.: US 7,768,588 B2
(45) Date of Patent: Aug. 3, 2010

(54) THIN FILM TRANSISTOR SUBSTRATE FOR LIQUID CRYSTAL DISPLAY

(75) Inventors: Jae Chang Kwon, Gyeongsangbuk-do (KR); Sun Yong Lee, Daegu (KR); Se Eung Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 236 days.

(21) Appl. No.: 11/643,974

(22) Filed: Dec. 22, 2006

(65) Prior Publication Data

US 2008/0002083 A1 Jan. 3, 2008

(30) Foreign Application Priority Data

Jun. 30, 2006 (KR) .................. 10-2006-0060448

(51) Int. Cl.
*G02F 1/136* (2006.01)

(52) U.S. Cl. ........................................ 349/43; 349/139

(58) Field of Classification Search .................. 349/43, 349/84, 104, 106, 108, 139–144
See application file for complete search history.

(56) References Cited

U.S. PATENT DOCUMENTS 6,342,938 B1 * 1/2002 Song et al. ................. 349/143
2002/0159015 A1 10/2002 Seo et al.
2003/0193625 A1 * 10/2003 Yoshida et al. ............. 349/43
2005/0237447 A1 * 10/2005 Ono ........................... 349/106

FOREIGN PATENT DOCUMENTS

| CN | 1690803 | 11/2005 |
|---|---|---|
| JP | 10-274777 | 10/1998 |
| JP | 14-040433 | 2/2002 |
| KR | 10-1999-0017651 | 3/1999 |
| KR | 10-1999-0086579 | 12/1999 |
| KR | 10-2001-0003751 | 1/2001 |
| KR | 10-2002-0002055 | 1/2002 |
| KR | 10-2002-0043943 | 6/2002 |

* cited by examiner

*Primary Examiner*—Sarah Song
(74) *Attorney, Agent, or Firm*—McKenna Long & Aldridge

(57) ABSTRACT

A thin film transistor (TFT) substrate for a liquid crystal display is provided. The thin film transistor substrate includes: a plurality of gate lines and a plurality of data lines that cross each other and define a plurality of sub-pixels; and a plurality of unit pixels in which first and second unit pixels are alternately formed in a direction of the gate lines and first and second unit pixels are formed vertically in a direction of the data lines, wherein the first unit pixel includes three sub-pixels and the first electrodes are slanted with respect to the gate lines and the data lines in each sub-pixel, the second unit pixel includes three sub-pixels and the second electrodes are a slanted with respect to the gate lines and the data lines in each sub-pixel, and the slant of the second electrodes is symmetrical to the slant of the first electrodes.

16 Claims, 8 Drawing Sheets

THIN FILM TRANSISTOR SUBSTRATE FOR LIQUID CRYSTAL DISPLAY

This application claims the benefit of Korean Patent Application No. 2006-0060448, filed on Jun. 30, 2006, which is hereby incorporated by reference for all purposes as if fully set forth herein.

BACKGROUND OF THE INVENTION

1. Field of the invention

The present invention relates to a thin film transistor (TFT) substrate for a liquid crystal display (LCD).

2. Discussion of the Related Art

As information and telecommunication technologies advance, display devices for displaying images such as televisions, computer monitors, and notebook computers, etc., are increasingly used. Cathode ray tubes (CRTs) have been commonly used for the display devices. However, CRTs have the disadvantage of being heavy, and large.

Therefore, flat panel displays such as liquid crystal displays (LCD), plasma display panels (PDP), and an organic light emitting diodes (OLED), etc., are being used as substitutes for the CRTs. Of these, LCDs are commonly used with their advantages of high resolution, thin profile and the ability to be fabricated in a small or large size.

The LCDs are devices for displaying images by using electro-optical characteristics of liquid crystal molecules and can be divided into a twisted nematic (TN) mode LCD, a vertically aligned (VA) mode LCD, and an in-plane switching (IPS) mode LCD. The LCDs of each mode can display images by controlling a light transmittance by changing an arrangement of liquid crystal molecules according to an applied voltage.

In the various modes of LCDs, the IPS mode LCD receives much attention thanks to its advantageous characteristics that it can implement a wide viewing angle so that it has an excellent viewing angle at the side.

FIG. 1 is a plan view showing an IPS mode LCD according to the related art.

With reference to FIG. 1, the related art IPS mode LCD 1 includes a gate line, a data line, a unit pixel (P), and a liquid crystal layer.

The gate line and the data line cross each other. In this example, the gate line is formed in an x-axis direction and the data line is formed in a y-axis direction.

A plurality of sub-pixels are defined as gate lines and data lines cross each other.

The unit pixel (P) includes red, green, and blue sub-pixels (R, G, and B), and unit pixels (P) are disposed vertically and horizontally in the both directions along the gate lines and data lines.

A pixel electrode 50 and a common electrode 60 are formed in parallel to the data line in each of the red, green, and blue sub-pixels (R, G, and B) of the unit pixel. The common electrode 60 forms in in-plane field (E) together with the pixel electrode 50.

A liquid crystal layer is formed between a color filter substrate 20 and a TFT substrate 30 that are separated by a fixed gap and face each other. The color filter substrate 20 includes black matrixes and a plurality of color filters.

A liquid crystal layer is formed between the color filter substrate 20 and the TFT substrate 30. Liquid crystal molecules 10 in the liquid crystal layer have a dielectric constant anisotropy (Δε) and a refractive index anisotropy (Δn).

In FIG. 1, 'C' indicates a rubbing axis of an alignment film that determines an initial arrangement of the liquid crystal molecules 10.

In the IPS mode LCD 1, the liquid crystal molecules 10 are uniformly arranged along the rubbing axis (C) of the alignment film on the entire area of the LCD before the in-plane fields (E) are formed between the pixel electrodes 50 and the common electrodes 60.

When the in-plane fields (E) are formed between the pixel electrodes 50 and the common electrodes 60, the optical axes of the liquid crystal molecules 10 are uniformly rotated to be parallel to the in-plane fields (E) between the pixel electrodes 50 and the common electrodes 60.

Because of the characteristics of the liquid crystal molecules 10 that are uniformly arranged according to the formation of the in-plane fields (E) and have the refractive index anisotropy (Δn), when the LCD 1 is viewed at a certain tilt angle, it assumes an undesired color depending on a direction of a viewing angle. This will be described in detail with reference to equation (1):

$$T = T_o * \sin^2(2_\chi) * \sin^2(\pi * \Delta n d / \lambda) \qquad [\text{Equation 1}]$$

wherein 'T' is light transmittance, '$T_o$' is light transmittance with respect to the reference light, Δn is a refractive index anisotropy, 'd' is a cell gap, and λ is a wavelength of incident light.

According to Equation 1, when a phase difference Δnd changes, the wavelength of light incident to obtain a maximum light transmittance (T) changes. Thus, as the phase difference Δnd changes, the LCD 1 assumes an undesired color according to the direction of the viewing angle.

Namely, the refractive index anisotropy Δn of the liquid crystal molecules 10 differs in the direction (A) in which the longer axes of liquid crystal molecules 10 are viewed and in the direction (B) in which the shorter axes of the liquid crystal molecules are viewed, so the wavelength (λ) of light incident to obtain the maximum light transmittance (T) should change, and in this case, a color corresponding to the wavelength (λ) of incident light is manifested in the LCD 1.

In detail, because the refractive index anisotropy Δn relatively increases in the direction (A) in which the longer axes of the liquid crystal molecules 10 are viewed, the incident light wavelength (λ) is also relatively lengthened, resulting in that a yellowish color having a relatively long wavelength is displayed on the LCD 1.

Meanwhile, in the direction (B) in which the shorter axes of the liquid crystal molecules 10 are viewed, the refractive index anisotropy Δn relatively decreases, so the wavelength (λ) of light incident to reach the maximum light transmittance (T) also is reduced, resulting in that bluish color with a relatively short length is displayed on the LCD 1.

The phenomenon where the yellow or blue color is displayed at the certain azimuth angles is called a color shift that leads to degradation of picture quality of the LCD 1.

In order to prevent the color shift, a technique has been developed, in which each of the sub-pixels (R, G, and B) are divided into two symmetrical domains and the pixel electrodes 50 and the common electrodes 650 are symmetrically formed in the two domains to thus compensate for the difference of refractive index anisotropy Δn.

However, this technique has a problem where the liquid crystal molecules 10 at the boundaries of adjacent domains cannot be controlled, so that the boundary regions of adjacent domains must be overlapped with black matrixes that degrades an aperture ratio.

SUMMARY OF THE INVENTION

Accordingly, the present invention is directed to a thin film transistor substrate for a liquid crystal display that substantially obviates one or more of the problems due to limitations and disadvantages of the related art.

An advantage of the present invention is to provide a thin film transistor (TFT) substrate for an LCD capable compensating for a color shift.

Another advantage of the present invention is to provide a TFT substrate for an LCD capable of having a high aperture ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the present invention, as embodied and broadly described, a TFT substrate for an LCD includes: a plurality of gate lines and a plurality of data lines that cross each other and define a plurality of sub-pixels; and a plurality of unit pixels in which first and second unit pixels are alternately formed in a direction of the gate lines and first and second unit pixels are formed vertically in a direction of the data lines, wherein the first unit pixel includes three sub-pixels and the first electrodes are slanted with respect to the gate lines and the data lines in each sub-pixel, the second unit pixel includes three sub-pixels and the second electrodes are a slanted with respect to the gate lines and the data lines in each sub-pixel, and the slant of the second electrodes is symmetrical to the slant of the first electrodes.

In another aspect of the present invention, an LCD includes: a TFT substrate having first and second unit pixels that are alternately located in a direction along gate lines and also located vertically in a direction along data lines, the first and second unit pixels in a matrix; a color filter substrate that faces the TFT substrate; a liquid crystal layer between the TFT substrate and the color filter substrate, wherein the first unit pixel includes three sub-pixels and first electrodes slant with respect to the gate lines and the data lines in each sub-pixel, the second unit pixel includes three sub-pixels and second electrodes slant with respect to the gate lines and the data lines in each sub-pixel, and the slant of the second electrodes is symmetrical to the slant of the first electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, examples of which is illustrated in the accompanying drawings.

A thin film transistor (TFT) substrate for a liquid crystal display (LCD) according to the exemplary embodiment of the present invention will be described in detail with reference to the accompanying drawings.

Figure 1:
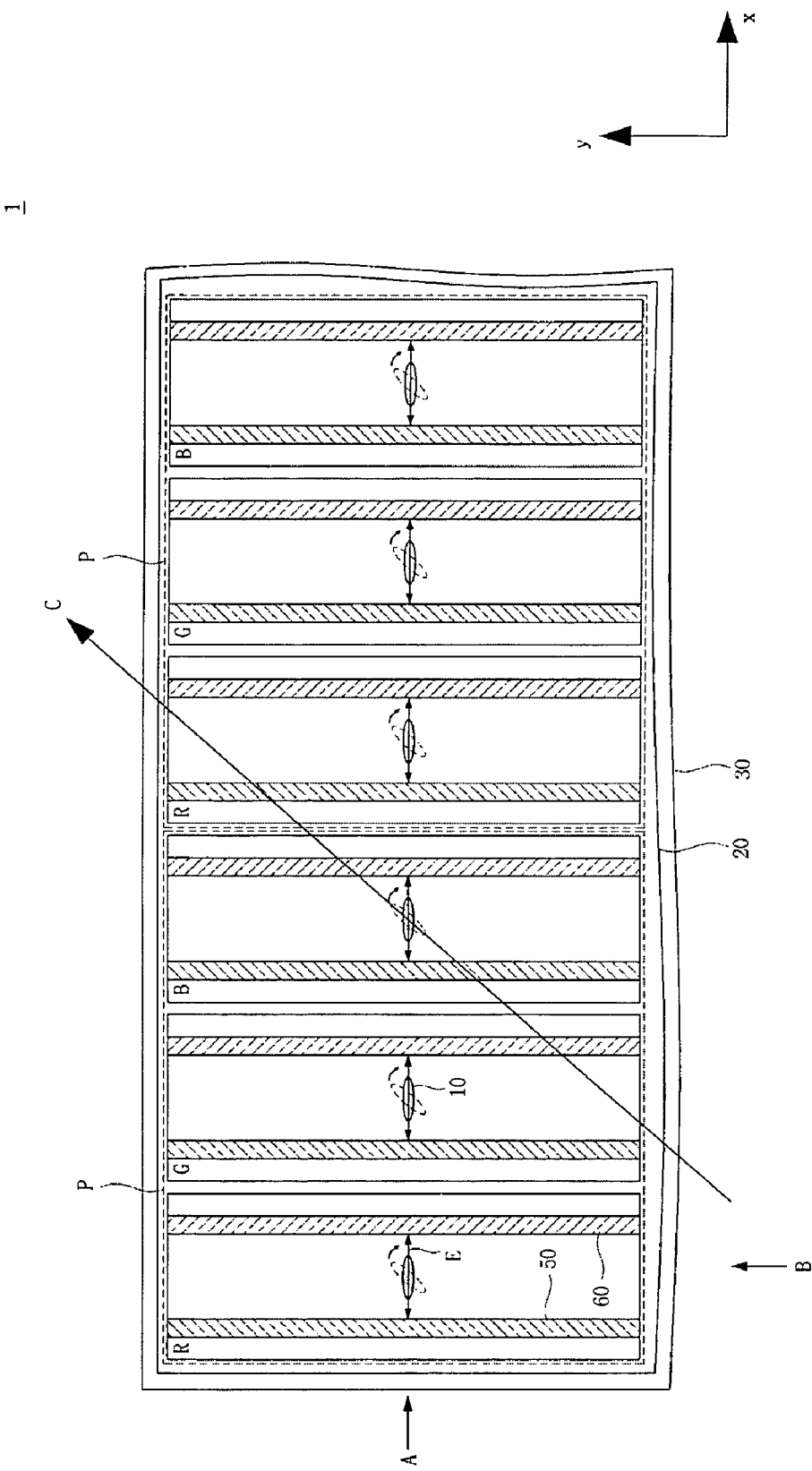
FIG. 1 is a plan view for explaining an in-plane switching (IPS) mode liquid crystal display (LCD) according to the related art.
Figure 2:
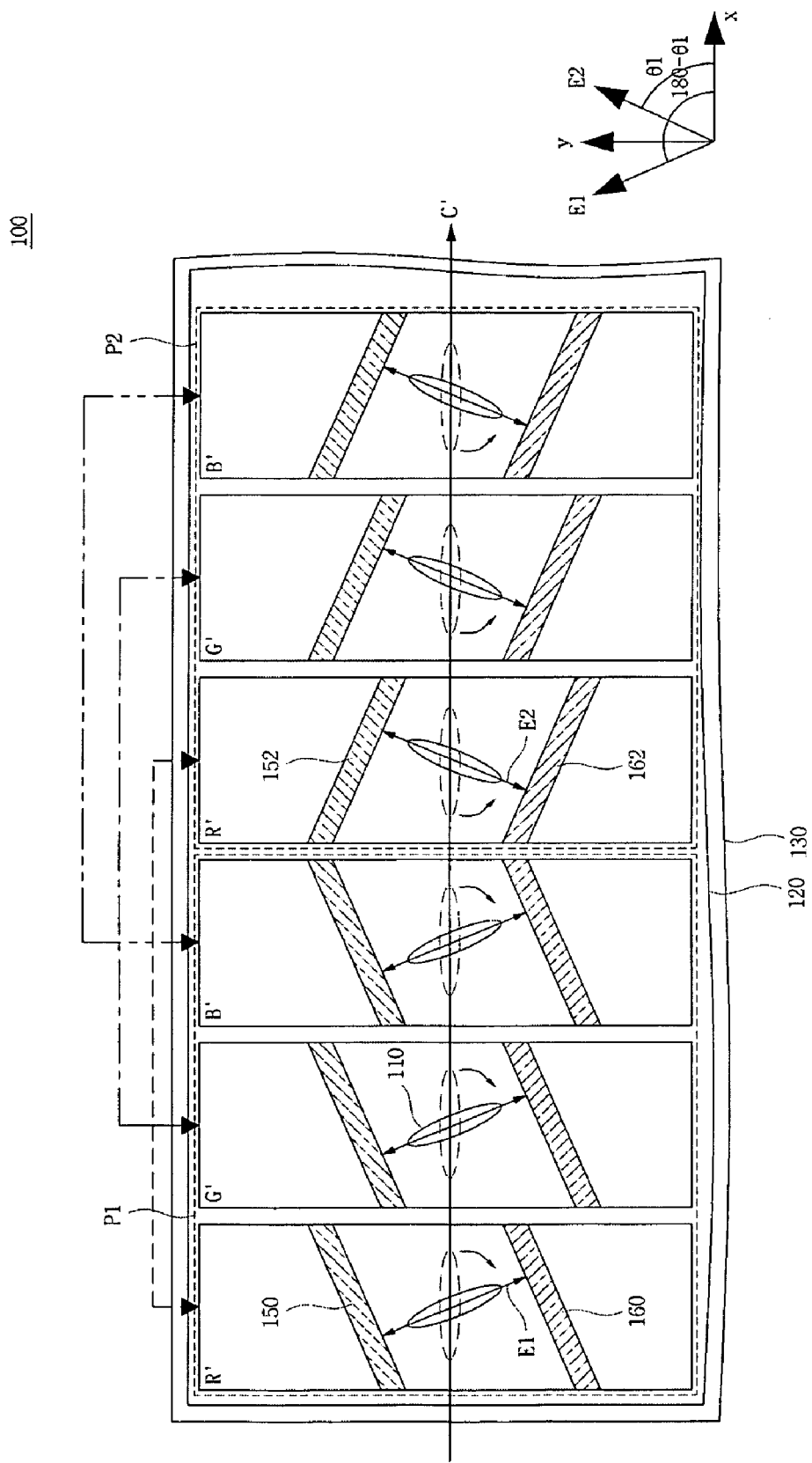
FIG. 2 is a plan view for explaining an IPS mode LCD according to a first embodiment of the present invention.

FIG. 2 is a plan view for explaining an in-plane switching (IPS) mode LCD according to a first embodiment of the present invention.

In FIG. 2, a gate line, a data line and a TFT formed on a TFT substrate are omitted in the illustration in order to focus on explanation of the operation of the liquid crystal molecules according to a first in-plane field formed by a first pixel electrode and a first common electrode and a second in-plane field formed by a second pixel electrode and a second common electrode.

The first and second pixel electrodes and the first and second common electrodes are schematically shown. The structure of an IPS mode LCD according to a first embodiment of the present invention will be described before an explanation of the operation of the liquid crystal molecules according to the first in-plane field formed by the first pixel electrode and the first common electrode and the second in-plane field formed by the second pixel electrode and the second common electrode.

With reference to FIG. 2, an IPS mode LCD 100 according to the first embodiment of the present invention includes a gate line, a data line, first and second unit pixels (P1 and P2), and a liquid crystal layer.

The gate and data lines cross each other to define a plurality of sub-pixels. The plurality of sub-pixels may include red, green, and blue sub-pixels (R', G', and B'). For the present example, the gate lines are formed in an x-axis direction, and the data lines are formed in a y-axis direction.

The first and second unit pixels P1 and P2 are alternately formed in a direction along the gate line and formed vertically in a direction of the data line.

The first unit pixel P1 includes at least three sub-pixels, among the plurality of pixels. The at least three sub-pixels of the first unit pixel may include the red, green, and blue sub-pixels (R', G', and B').

Each of the at least three sub-pixels of the first unit pixel P1 includes a first pixel electrode 150 and a first common electrode 160 that are formed such that they are not parallel to the gate line and the data line. In other words, the first pixel electrode 150 and the first common electrode 160 are slanted with respect to the data line and data line.

The first common electrode 160 may be formed in a direction parallel to the first pixel electrode 150. Thus, the first common electrode 160 may form a first in-plane field E1 together with the first pixel electrode 150. Herein, the first in-plane field E1 makes an angle of 180-$\theta_1$ to the x-axis.

The second unit pixel P2 comprises at least three sub-pixels, among the plurality of sub-pixels. Herein, the at least three sub-pixels of the second unit pixel may include red, green, and blue sub-pixels (R', G', and B').

Each of the at least three sub-pixels of the second unit pixel P2 includes a second pixel electrode 152 and a second common electrode 162 formed such that they are not parallel to the gate line and the data line.

The second pixel electrode 152 and the second common electrode 162 are slanted with respect to the gate line and data line. Herein, the slant of the second pixel electrode 152 and the second common electrode 162 of the second unit pixel P2 and the slant of the first pixel electrode 150 and the first common electrode 160 of the first unit pixel P1 are symmetrical to each other.

The second common electrode 162 and the second pixel electrode 152 may be formed in parallel. Thus, the second common electrode 162 may form a second in-plane field E2 together with the second pixel electrode 152.

The direction of the second in-plane field E2 of the second unit pixel P2 is symmetrical to that of the first in-plane field E1 of the first unit pixel P1.

Because the first unit pixels P1 are formed vertically in the direction of the data line, the first pixel electrodes 150 may be adjacent to each other vertically based on the gate line. In addition, the first common electrodes 160 may be adjacent to each other in the vertical direction (in the direction of the data line) based on the gate line.

The first pixel electrode 150 and the first common electrode 160 may have the same slant with respect to the gate line. Alternatively, the first pixel electrode 150 and the first common electrode 160 may have the slant that is symmetrical to the gate line.

In addition, because the second unit pixel P2 is formed vertically in the direction of data line, the second pixel electrodes 152 may be adjacent to each other up and down (in the direction of the data line) based on the gate line.

In addition, the second common electrodes 162 may also be also adjacent to each other up and down (in the direction of data line) based on the gate line. Herein, the second pixel electrode 152 and the second common electrode 162 may have the same slant with respect to the gate lines. Alternatively, the second pixel electrode 152 and the second common electrode 162 may have a slant symmetrical to the gate line.

The at least three sub-pixels of the first unit pixel P1 and the at least three sub-pixels of the second pixel P2 may be the same based on the first and second unit pixels P1 and P2.

For example, when the first and second unit pixels P1 and P2 include red, green, and blue sub-pixels R', G', and B', respectively, red, green, and blue sub-pixels R', G', and B' of the first and second unit pixels P1 and P2 may be disposed in the order of red, green, and blue sub-pixels R', G', and B' in the x-axis direction.

The liquid crystal layer is formed entirely between the color filter substrate 120 and the TFT substrate 130 that are separated with a gap therebetween and face each other. Herein, the color filter substrate 120 includes a black matrix that overlaps with at least one of the gate line, the data line and the TFT, and a plurality of color filters (e.g., red, green, and blue color filters) that overlap with the plurality of sub-pixels.

Because the liquid crystal layer is entirely formed between the color filter substrate 120 and the TFT substrate 130, the liquid crystal layer is formed in the at least three sub-pixels of the first unit pixel P1 and the at least three sub-pixels of the second unit pixel P2. The liquid crystal molecules 110 forming the liquid crystal layer have a dielectric constant anisotropy ($\Delta\epsilon$) and a refractive index anisotropy ($\Delta n$). Herein, the dielectric constant anisotropy ($\Delta\epsilon$) may be positive.

In FIG. 2, C' indicates a rubbing axis of an alignment film which determines an initial arrangement of the liquid crystal molecules 110 and is formed on the color filter substrate 120 and the TFT substrate 130, respectively.

Herein, the rubbing axis C' may correspond to a polarization axis of a lower polarization plate formed on an outer surface of the TFT substrate 130 and may be perpendicular to a polarization axis of an upper polarization plate formed on an outer surface of the color filter substrate.

The operation of the liquid crystal molecules 110 according to the first and second in-plane fields E1 and E2 in the IPS mode LCD 100 according to the first embodiment of the present invention as described above will be described in detail. First, when the first in-plane fields E1 are not formed between the first pixel electrodes 150 and the first common electrodes 160 and when the second in-plane fields E2 are not formed between the second pixel electrodes 152 and the second common electrodes 162, the liquid crystal molecules 110 are arranged such that their longer axes correspond to the rubbing axis C'.

Then, when light, which has passed through the lower polarization plate, passes through the liquid crystal molecules 110, its polarization state does not change. Accordingly, because the light which has passed through the liquid crystal molecules 110 cannot pass through the upper polarization plate perpendicular to the polarization axis of the lower polarization plate, the LCD 100 displays a black state.

When the first in-plane fields E1 is formed as a voltage difference is applied between the first pixel electrodes 150 and the first common electrode 160 and when the second in-plane fields E2 is formed as a voltage difference is applied between the second pixel electrodes 152 and the second common electrodes 162, the first in-plane field E1 with an angle of $180-\theta_1$ to the x axis is formed at the first unit pixel P1, and the second in-plane field E2 making an angle of $\theta_1$ to the x axis is formed at the second unit pixel P2.

The angle $\theta_1$ between the polarization axis of the lower polarization plate identical to the rubbing axis C' of the alignment film and the first and second in-plane fields E1 and E2 can be between about 45° and about 90°. This is to satisfy the maximum transmittance of the LCD 100. In other words, when the angle θ1 between the polarization axis of the lower polarization plate and the first and second in-plane fields E1 and E2 is between about 45° and about 90°, the liquid crystal molecules 110 with the positive dielectric constant anisotropy ($\Delta\epsilon$) may be arranged such that their longer axes are parallel to the first and second in-plane fields E1 and E2. Because the liquid crystal molecules 110 can sufficiently rotate to the angle of about 45°, the LCD may display a white state with the maximum light transmittance.

The rotational direction of the liquid crystal molecules 110 of the liquid crystal layer of the at least three sub-pixels of the second unit pixel P2 and that of the liquid crystal molecules 110 of the liquid crystal layer of the at least three sub-pixels of the first unit pixel P1 are in opposite directions.

While the liquid crystal molecules 110 of the liquid crystal layer of the at least three sub-pixels of the first unit pixel P1 rotate clockwise by the first in-plane field E1, the liquid crystal molecules 110 of the liquid crystal layer of the at least three sub-pixels of the second unit pixel P2 rotate counterclockwise by the second in-plane field E2 that is symmetrical to the first in-plane field E1. Accordingly, a difference of refractive index anisotropy $\Delta n$ between the liquid crystal molecules 110 of the first and second unit pixels P1 and P2 may be compensated. In this case, the difference of the refractive index anisotropy Δn of the liquid crystal molecules 110 at the at least three sub-pixels of the second unit pixel P1 that correspond to the at least three sub-pixels of the first unit pixel P1 may be compensated.

For example, the difference of the refractive index anisotropy Δn of the liquid crystal molecules 110 between the red sub-pixels R' of each of the first and second unit pixels P1 and P2 may be compensated, the difference of the refractive index anisotropy Δn of the liquid crystal molecules 110 between the green sub-pixels G' of each of the first and second unit pixels P1 and P2 may be compensated, and the difference of refractive index anisotropy Δn of the liquid crystal molecules 110 between the blue sub-pixels B' of each of the first and second unit pixels P1 and P2 may be compensated.

At the side of the first and second unit pixels P1 and P2, the liquid crystal molecules 110 rotate in the same direction, but because the eyes of users of the LCD 100 are not sensitive enough to recognize each of the first and second unit pixels P1 and P2, the user cannot actually notice a color shift phenomenon.

In addition, there is no domain division at each of the plurality of sub-pixels. Because only one domain is formed at each of the plurality of sub-pixels, the black matrix can overlap with at least one of the gate line, the data line, and the TFT to thus improve an aperture ratio.

Figure 3:
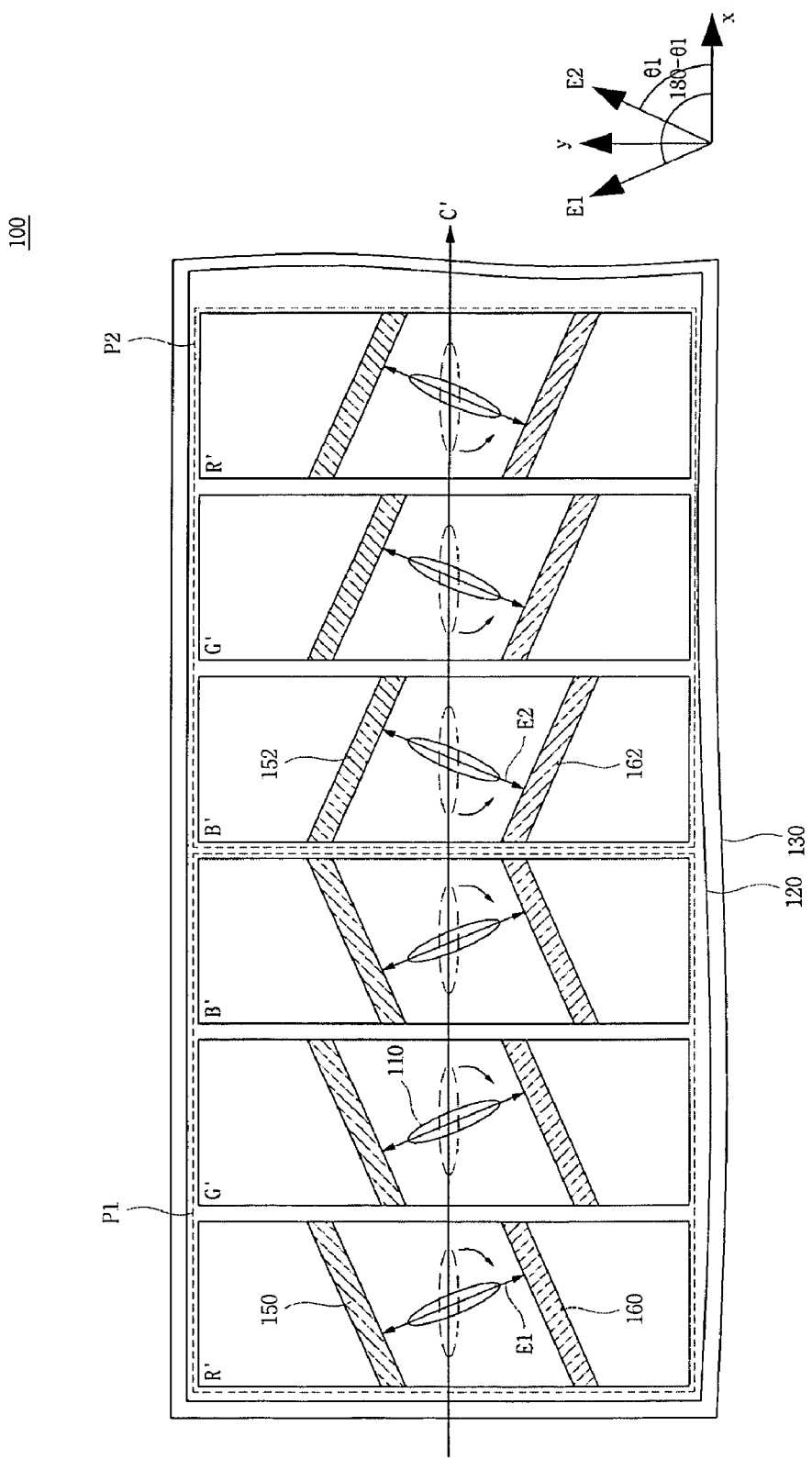
FIG. 3 is a plan view for explaining an IPS mode LCD according to a second embodiment of the present invention.

FIG. 3 is a plan view for explaining an IPS mode LCD according to a second embodiment of the present invention. The IPS mode LCD according to the second embodiment of the present invention has the same structure as that of the first embodiment of the present invention except for the location of a plurality of sub-pixels, so only its characteristics will be described.

With reference to FIG. 3, the IPS mode LCD 100 according to the second embodiment of the present invention includes a gate line, a data line, first and second unit pixels P1 and P2, and a liquid crystal layer.

In the IPS mode LCD 100 according to the second embodiment of the present invention, at least three sub-pixels of the first unit pixel P1 and at least three sub-pixels of the second unit pixel P2 are disposed to be symmetrical to each other between the first and second unit pixels P1 and P2. For example, when the first and second unit pixels P1 and P2 comprise red, green, and blue sub-pixels R', G', and B', respectively, the red, green, and blue sub-pixels R', G', and B' of the first unit pixel P1 may be disposed in the order of red, green, and blue sub-pixels R', G', and B' in the x-axis direction. Meanwhile, the red, green, and blue sub-pixels R', G', and B' of the second unit pixel P2 may be disposed in the reverse order of the disposition order at the first unit pixel P1, namely, in the order of blue, green, and red sub-pixels B', G', and R' in the x-axis direction.

The liquid crystal molecules 110 of each of the liquid crystal layer in the at least three sub-pixels of the first unit pixel P1 rotate clockwise by the first in-plane field E1 formed between the first pixel electrodes 150 and the first common electrodes 160. The liquid crystal molecules 110 of the liquid crystal layer in the at least three sub-pixels of the second unit pixel P2 are symmetrical to the first in-plane field E1 and rotate counterclockwise by the second in-plane field E2 formed between the second pixel electrodes 152 and the second common electrodes 162. Accordingly, a difference of the refractive index anisotropy Δn of the liquid crystal molecules 110 between the first and second unit pixels P1 and P2 is compensated. In this case, the difference of the refractive index anisotropy Δn of the liquid crystal molecules 110 at the at least three sub-pixels of the second unit pixel P1 that correspond to the at least three sub-pixels of the first unit pixel P1 may be compensated.

At the side of the first and second unit pixels P1 and P2, the liquid crystal molecules 110 rotate in the same direction, but the user cannot actually notice a color shift phenomenon.

Also, because there is no domain division at each of the plurality of sub-pixels, the black matrix may overlap with at least one of the gate line, the data line, and the TFT to thus improve an aperture ratio.

Figure 4:
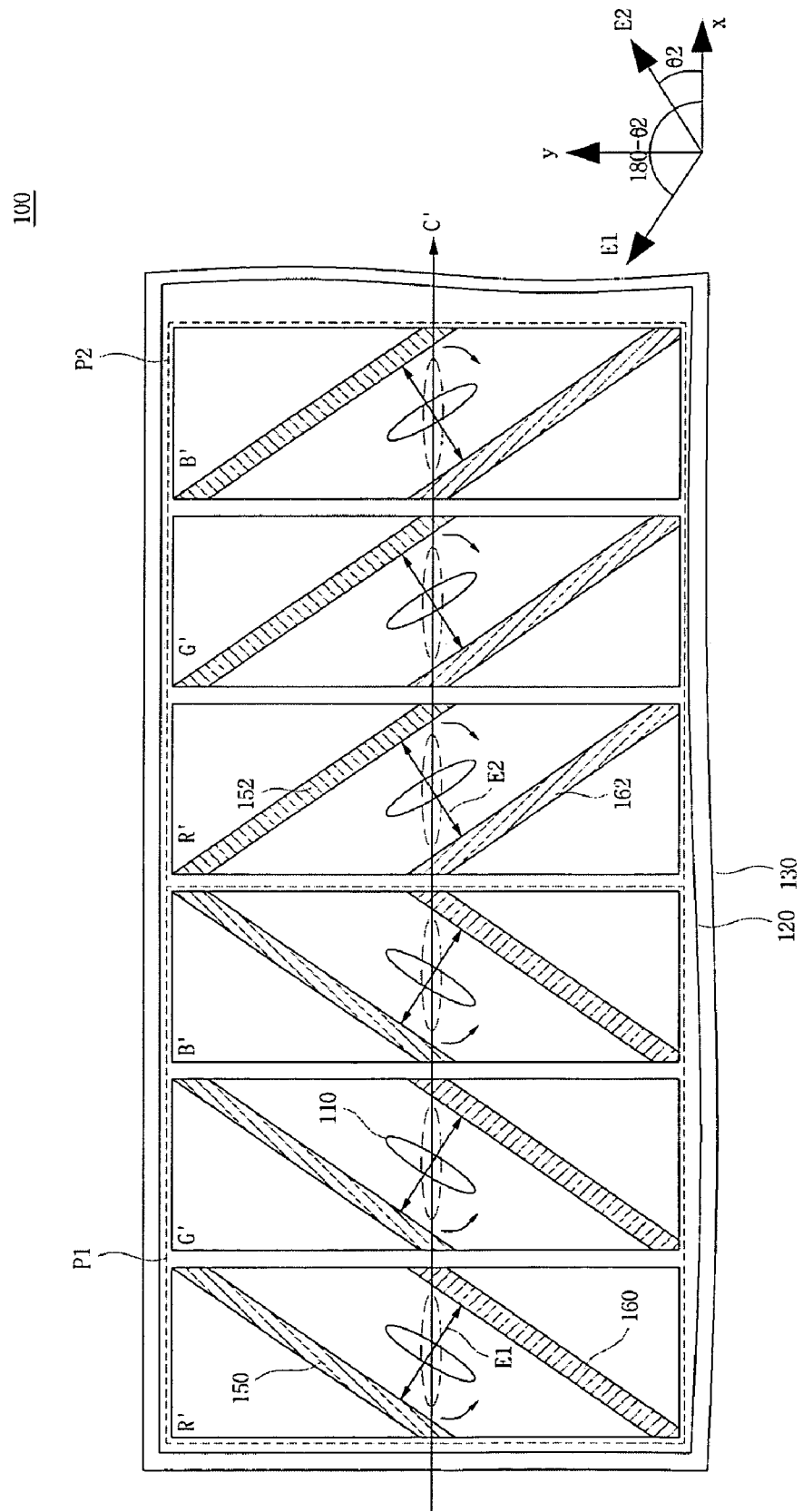
FIG. 4 is a plan view for explaining an IPS mode LCD according to a third embodiment of the present invention.

FIG. 4 is a plan view for explaining an IPS mode LCD according to a third embodiment of the present invention.

The IPS mode LCD according to the third embodiment of the present invention has the same structure as that of the first embodiment of the present invention except for an angle made by the polarization axis of the lower polarization plate and the first and second in-plane fields and a dielectric constant anisotropy of liquid crystal molecules, so only its characteristics will be described.

With reference to FIG. 4, the IPS mode LCD 100 according to the third embodiment of the present invention includes a gate line, a data line, first and second unit pixels P1 and P2, and a liquid crystal layer.

The liquid crystal layer is formed entirely between the color filter substrate 120 and the TFT substrate 130 which are separated with a gap and face each other. The liquid crystal layer is formed in the at least three sub-pixels of the first unit pixel P1 and the at least three sub-pixels of the second unit pixel P2. The liquid crystal molecules 110 forming the liquid crystal layer have a dielectric constant anisotropy (Δε) and a refractive index anisotropy (Δn). The dielectric constant anisotropy (Δε) may be negative.

In the LCD 100 according to the third embodiment of the present invention, when the first in-plane fields E1 are formed as a voltage difference is applied between the first pixel electrodes 150 and the first common electrode 160 and when the second in-plane fields E2 are formed as a voltage difference is applied between the second pixel electrodes 152 and the second common electrodes 162, the first in-plane field E1 with an angle of 180-$\theta_2$ to the x axis is formed at the first unit pixel P1, and the second in-plane field E2 with an angle of $\theta_2$ to the x axis is formed at the second unit pixel P2.

The angle $\theta_2$ between the polarization axis of the lower polarization plate is identical to the rubbing axis C' of the alignment film and the first and second in-plane fields E1 and E2 can be between about 1° and about 45°. This is to satisfy the maximum transmittance of the LCD 100.

In other words, when the angle $\theta_2$ between the polarization axis of the lower polarization plate and the first and second in-plane fields E1 and E2 is between about 1° and about 45°, the liquid crystal molecules 110 with the negative dielectric constant anisotropy (Δε) may be arranged such that their shorter axes are parallel to the first and second in-plane fields E1 and E2. In this case, because the liquid crystal molecules 110 may be sufficiently rotated at the angle of about 45°, the LCD may display a white state with the maximum light transmittance.

In this case, at the side of the first and second unit pixels P1 and P2, the liquid crystal molecules 110 rotate in the same direction, but because the rotational direction of the liquid crystal molecules 110 of the liquid crystal layer of the at least three sub-pixels of the second unit pixel P2 and that of the liquid crystal molecules 110 of the liquid crystal layer of the at least three sub-pixels of the first unit pixel P1 are the opposite, the user cannot actually notice a color shift phenomenon.

In addition, because there is no domain division at each of the plurality of sub-pixels, the aperture ratio may be improved by overlapping the black matrix with at least one of the gate line, the data line, and the TFT to thus improve an aperture ratio.

Figure 5:
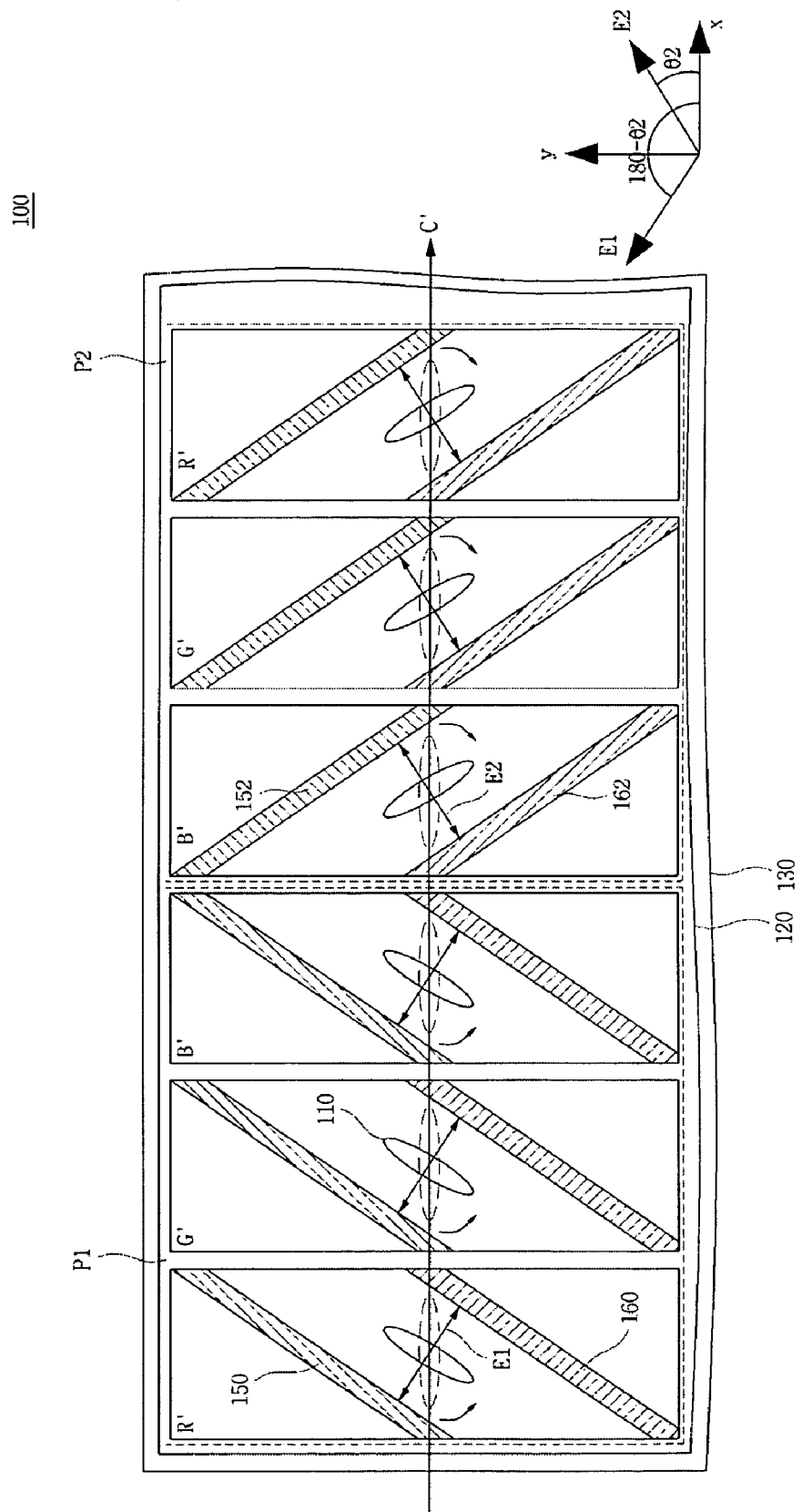
FIG. 5 is a plan view for explaining an IPS mode LCD according to a fourth embodiment of the present invention.

FIG. 5 is a plan view for explaining an IPS mode LCD according to a fourth embodiment of the present invention. The IPS mode LCD according to the fourth embodiment of the present invention has the same structure as that of the third embodiment of the present invention except for the location of a plurality of sub-pixels, so only its characteristics will be described.

With reference to FIG. 5, the IPS mode LCD 100 according to the fourth embodiment of the present invention includes a gate line, a data line, first and second unit pixels P1 and P2, and a liquid crystal layer.

In the IPS mode LCD 100 according to the fourth embodiment of the present invention, at least three sub-pixels of the first unit pixel P1 and at least three sub-pixels of the second unit pixel P2 are disposed to be symmetrical to each other between the first and second unit pixels P1 and P2.

For example, when the first and second unit pixels P1 and P2 comprise red, green, and blue sub-pixels R', G', and B', respectively, the red, green, and blue sub-pixels R', G', and B' of the first unit pixel P1 may be disposed in the order of red, green, and blue sub-pixels R', G', and B' in the x-axis direction.

Meanwhile, the red, green, and blue sub-pixels R', G', and B' of the second unit pixel P2 may be disposed in the reverse order versus the first unit pixel P1, namely, in the order of blue, green, and red sub-pixels B', G', and R' in the x-axis direction.

At the side of the first and second unit pixels P1 and P2, the liquid crystal molecules 110 rotate in the same direction, but because the rotational direction of the liquid crystal molecules 110 of the liquid crystal layer of the at least three sub-pixels of the second unit pixel P2 and that of the liquid crystal molecules 110 of the liquid crystal layer of the at least three sub-pixels of the first unit pixel P1 are opposite to one another, the user cannot actually notice a color shift phenomenon.

In addition, because there is no domain division at each of the plurality of sub-pixels, the aperture ratio may be improved by overlapping the black matrix with at least one of the gate line, the data line, and the TFT to thus improve an aperture ratio.

Figure 6:
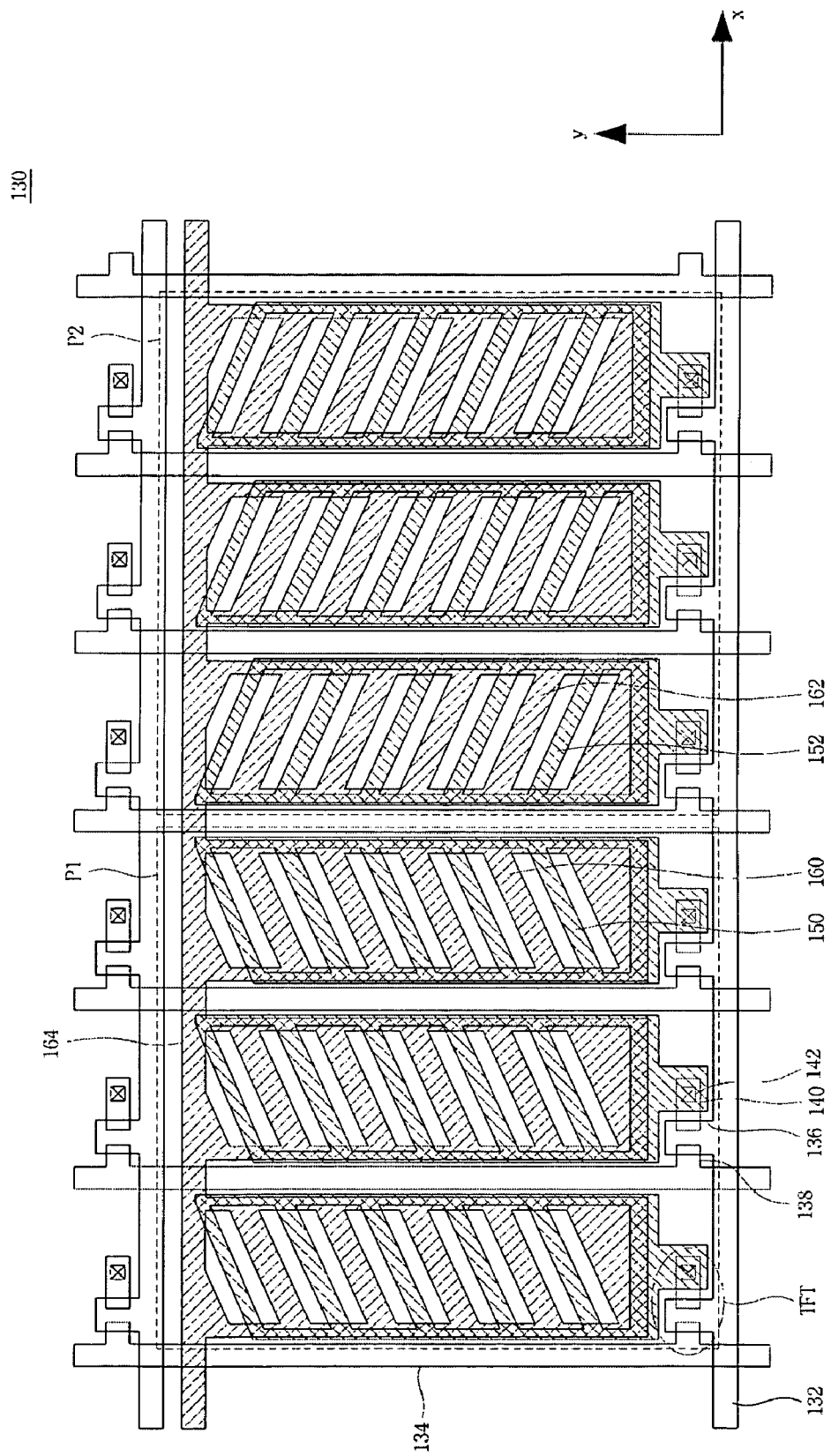
FIG. 6 is a plan view showing a thin film transistor substrate in FIG. 2.
Figure 7:
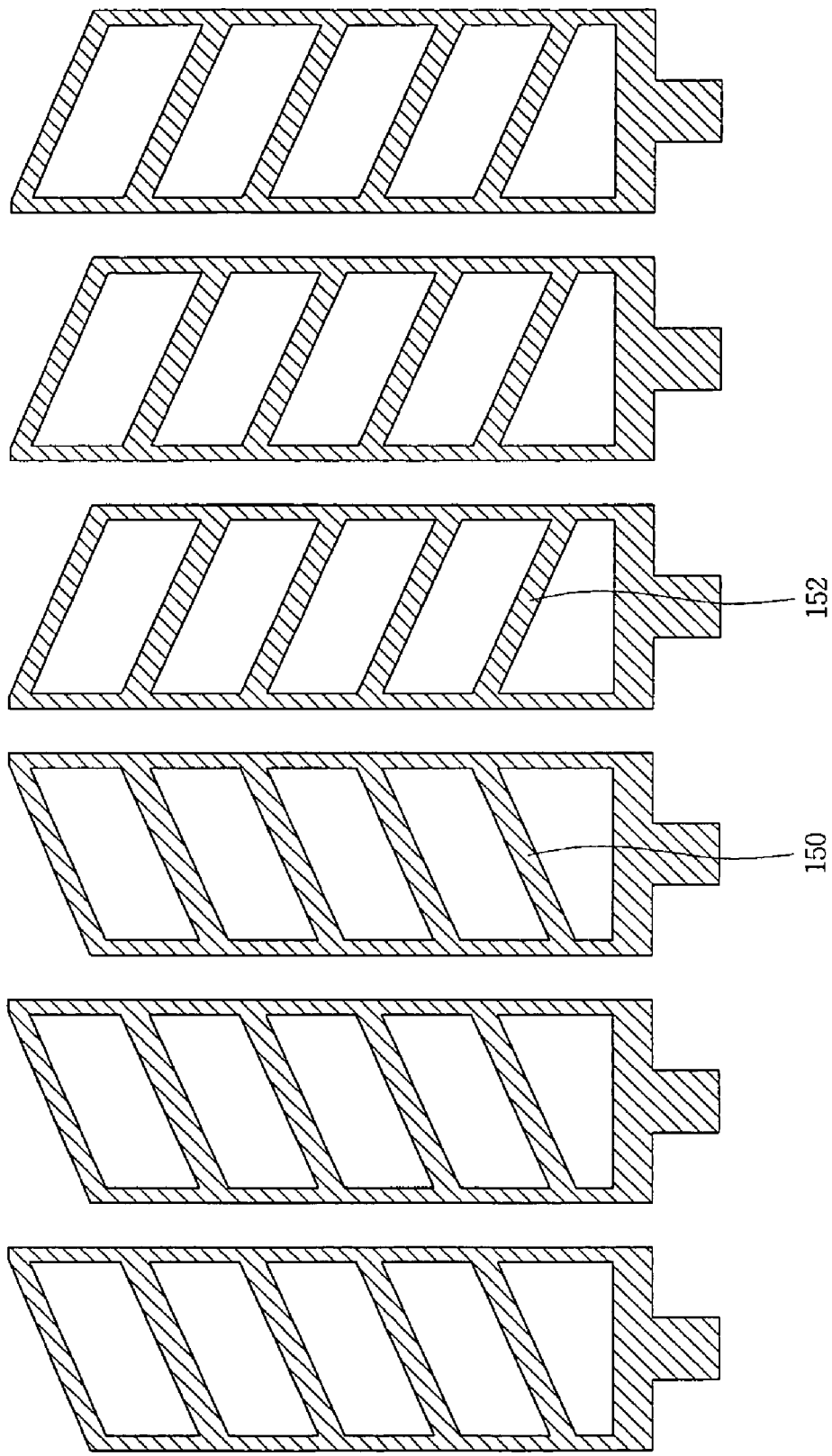
FIG. 7 is a plan view showing first and second pixel electrodes in FIG. 6.
Figure 8:
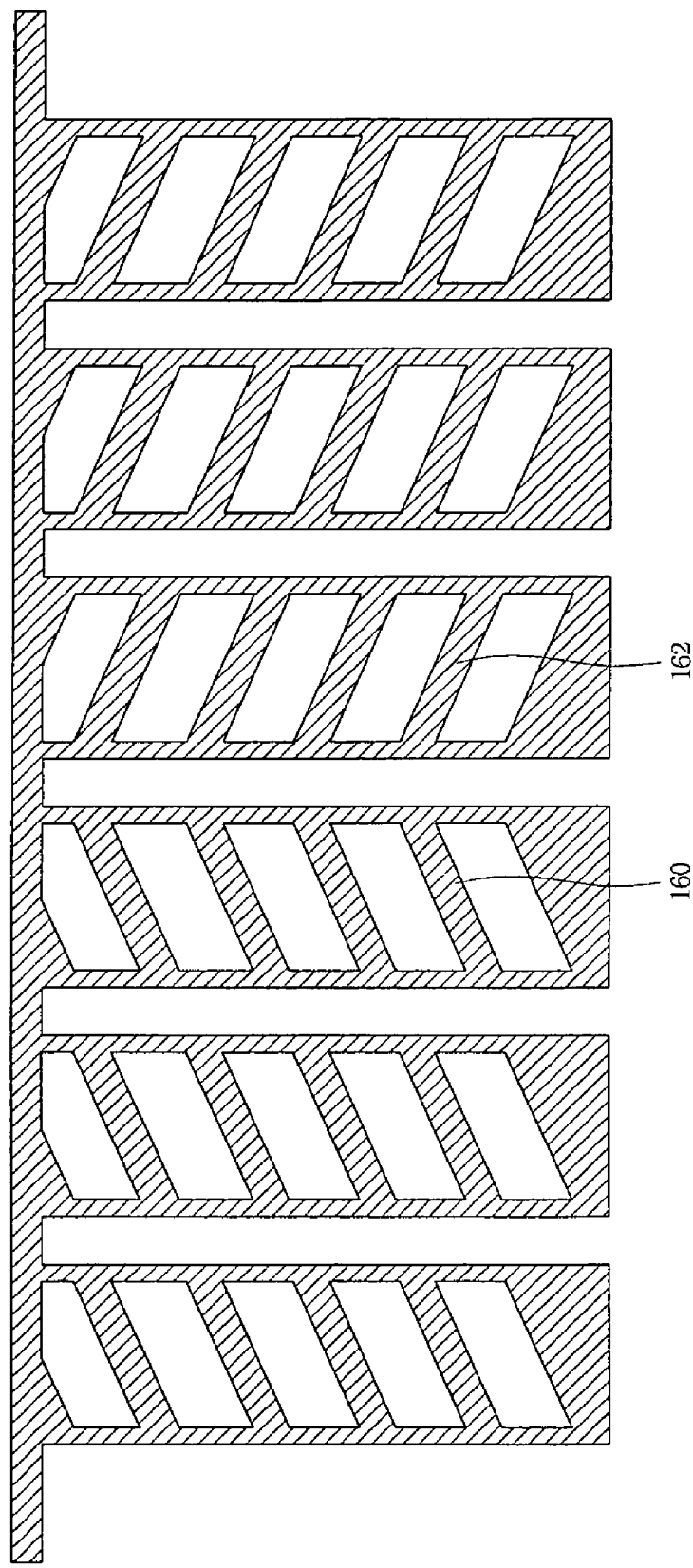
FIG. 8 is a plan view showing first and second common electrodes in FIG. 6.

FIG. 6 is a plan view showing a thin film transistor substrate in FIG. 2, FIG. 7 is a plan view showing first and second pixel electrodes in FIG. 6, and FIG. 8 is a plan view showing first and second common electrodes in FIG. 6. FIG. 6 illustrates the TFT substrate in FIG. 2 in more detail. The TFT substrates of the IPS mode LCDs of the FIGS. 3, 4, and 5 is similar to that as shown in FIG. 6, a detailed description for them will be omitted.

With reference to FIGS. 6 to 8, the TFT substrate 130 of the LCD 100 includes a gate line 132, a data line 134, and first and second unit pixels P1 and P2.

The gate line 132 provides a gate ON/OFF voltage from a driving circuit unit to a gate electrode 136. The gate line 132 may be made of a material such as Cr or a Cr alloy, Al or an Al alloy, Mo or an Mo alloy, Ag or an Ag alloy, Cu or a Cu alloy, Ti or a Ti alloy, and Ta or a Ta alloy, etc., and may be formed in one or more layers.

The data line 134 provides a data voltage provided from a driving circuit unit to a source electrode 138. The data line may be made of a material such as Cr or a Cr alloy, Al or an Al alloy, Mo or an Mo alloy, Ag or an Ag alloy, Cu or a Cu alloy, Ti or a Ti alloy, and Ta or a Ta alloy, etc., and may be formed in one or more layers.

Herein, the data line 134 is insulated from the gate line 132 by a gate insulation layer interposed between the data line 134 and the gate line 132 and crosses the gate line 132. Namely, as stated above, the gate line 132 and the data line 134 are formed in the x-axis direction and y-axis direction, respectively, to thus define a plurality of sub-pixels.

The first and second unit pixels P1 and P2 include the TFT, the first and second pixel electrodes 150 and 152, and the first and second common electrodes 160 and 162, respectively.

The TFT is formed in each of the plurality of sub-pixels and serves as a switching element by being turned on or off by the gate ON/OFF voltage from the gate line 132.

When the TFT is turned on, it provides the data voltage from the data line 134 to the first and second pixel electrodes 150 and 152. For this purpose, the TFT includes a gate electrode 136 connected with the gate line 132, a source electrode 138 connected with the data line 134, a drain electrode 140 connected with the first and second pixel electrodes 150 and 152, and an active layer for forming a channel and an ohmic contact layer formed on the active layer. The active layer and the ohmic contact layer overlaps with the gate electrode 136 and/or the gate line 132 with the gate insulation layer interposed therebetween.

The first and second pixel electrodes 150 and 152 apply the data voltage from the drain electrode 140 to the liquid crystal layer, respectively. The first and second pixel electrodes 150 and 152 may be made of a transparent conductive material such as indium tin oxide (ITO) or indium zinc oxide (IZO), respectively. Other characteristics of the first and second pixel electrodes 150 and 152 are the same as those described above, so a detailed description therefor will be omitted.

The first and second common electrodes 160 and 162 apply a common voltage provided from a common electrode line 164 connected thereto, to the liquid crystal layer, respectively. The first and second common electrodes 160 and 162 may be made of the same material on the same plane on which the gate line 132 is formed or may be made of the same material on the same plane with the first and second pixel electrodes 150 and 162. Herein, other characteristics of the first and second common electrodes 160 and 162 are the same as those described above, so a detailed description therefor will be omitted.

According to the present invention, a color shift phenomenon may be prevented and the aperture ratio may be enhanced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A thin film transistor (TFT) substrate for a liquid crystal display, comprising:

a plurality of gate lines and a plurality of data lines that cross each other and define a plurality of sub-pixels; and a plurality of unit pixels including every three sub-pixels along the gate line, in which first and second unit pixels are alternately formed in a direction of the gate lines and the first and the second unit pixels are formed serially in a direction of the data lines, wherein the three sub-pixels of the first unit pixel include pixel electrodes slanted with respect to the gate lines and the data lines in each sub-pixel, and common electrodes parallel to the pixel electrode to form a first in-lane field together with the pixel electrode, the three sub-pixels of the second unit pixel include pixel electrodes slanted with respect to the gate lines and the data lines in each sub-pixel, and common electrodes parallel to the pixel electrode to form a second in-plane field together with the pixel electrode, and all slants of the pixel electrodes of the first unit pixel have a first direction, and all slants of the pixel electrodes of the second unit pixel have a second direction symmetrical to the first direction.

2. The substrate of claim 1, wherein the pixel electrodes of the first unit pixel adjacent vertically along the gate lines have the same slant with respect to the gate lines.

3. The substrate of claim 2, wherein the pixel electrodes of the second unit pixel adjacent vertically along the gate lines have the same slant with respect to the gate lines.

4. The substrate of claim 1, wherein the pixel electrodes of the first unit pixel adjacent vertically along the gate lines have a slant symmetrical about the gate lines.

5. The substrate of claim 4, wherein the pixel electrodes of the second unit pixel adjacent vertically along the gate lines have a slant symmetrical about the gate lines.

6. The substrate of claim 1, wherein the three sub-pixels of the first and second unit pixels are located in the same order.

7. The substrate of claim 1, wherein the three sub-pixels of the first and second unit pixels are located in a symmetrical order to each other.

8. The substrate of claim 1, wherein the three sub-pixels of the first and second unit pixels include red, green, and blue sub-pixels.

9. A liquid crystal display (LCD) comprising:
a TFT substrate having first and second unit pixels that are alternately located in a direction along gate lines and also located serially in a direction along data lines, the first and second unit pixels in a matrix;
a color filter substrate that faces the TFT substrate;
a liquid crystal layer between the TFT substrate and the color filter substrate,
wherein the first unit pixel includes every three sub-pixels along the gate line, pixel electrodes slant with respect to the gate lines and the data lines in each sub-pixel, and common electrodes parallel to the pixel electrodes in each sub-pixel to form a first in-plane field together with the pixel electrodes,
the second unit pixel includes three sub-pixels, pixel electrodes slant with respect to the gate lines and the data lines in each sub-pixel, and common electrodes parallel to the pixel electrodes in each sub-pixel to form a second in-plane field together with the pixel electrodes, and
all slants of the pixel electrodes of the first unit pixel have a first direction, and all slants of the pixel electrodes of the second unit pixel have a second direction symmetrical to the first direction.

10. The LCD of claim 9, wherein the pixel electrodes of the first unit pixel adjacent up and down based on the gate line are formed in the same slant line direction with respect to the gate line.

11. The LCD of claim 10, wherein the pixel electrodes of the second unit pixel adjacent vertically along the gate lines have the same slant with respect to the gate lines.

12. The LCD of claim 9, wherein the pixel electrodes of the first unit pixel adjacent vertically along the gate lines have a slant symmetrical about the gate lines.

13. The LCD of claim 12, wherein the pixel electrodes of the second unit pixel adjacent vertically along the gate lines have a slant symmetrical about the gate lines.

14. The LCD of claim 9, wherein the three sub-pixels of the first and second unit pixels are located in the same order.

15. The LCD of claim 9, wherein the three sub-pixels of the first and second unit pixels are located in a symmetrical order to each other.

16. The substrate of claim 9, wherein the three sub-pixels of the first and second unit pixels include red, green, and blue sub-pixels.

* * * * *